June 9, 1942.    A. SOLTAN    2,286,121
SHOE SOLE TRIMMING MACHINE
Filed Feb. 3, 1941    2 Sheets-Sheet 2

INVENTOR
ALEXANDER SOLTAN
BY
ATTORNEY

Patented June 9, 1942

2,286,121

UNITED STATES PATENT OFFICE 2,286,121

SHOE SOLE TRIMMING MACHINE

Alexander Soltan, Port Jervis, N. Y.

Application February 3, 1941, Serial No. 377,092

8 Claims. (Cl. 12—88)

This invention relates to trimming machines for trimming the soles of shoes and other types of workpieces; and the object of the invention is to provide a machine of the character described employing a workpiece supporting table with a driven feed wheel exposed through the surface thereof to engage and feed a workpiece over the table together with a vertical frame disposed above the workpiece table with means in said frame for supporting and operating a cutter arranged to engage the peripheral edge of the workpiece fed over the table by said feed roller; a further object being to provide in the vertical frame a yieldably supported workpiece engaging roller for firmly retaining the workpiece in engagement with the feed roller; a further object being to provide means for adjusting the cutter vertically in the frame for proper alinement with the peripheral edge of the workpiece; a still further object being to provide means substantially enveloping the cutter for discharging dust or other particles from the workpiece and cutter, drawing the same in a direction away from the work table; and with these and other objects in view, the invention consists in a machine of the class and for the purpose specified, which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:

Fig. 3 is a front face view of the machine showparts of the construction broken away and in section.

Fig. 4 is a partial section on the line 4—4 of Fig. 2; and

Fig. 5 is a detailed sectional view looking in the direction of the arrows 5—5 of Fig. 1.

Figure 1:
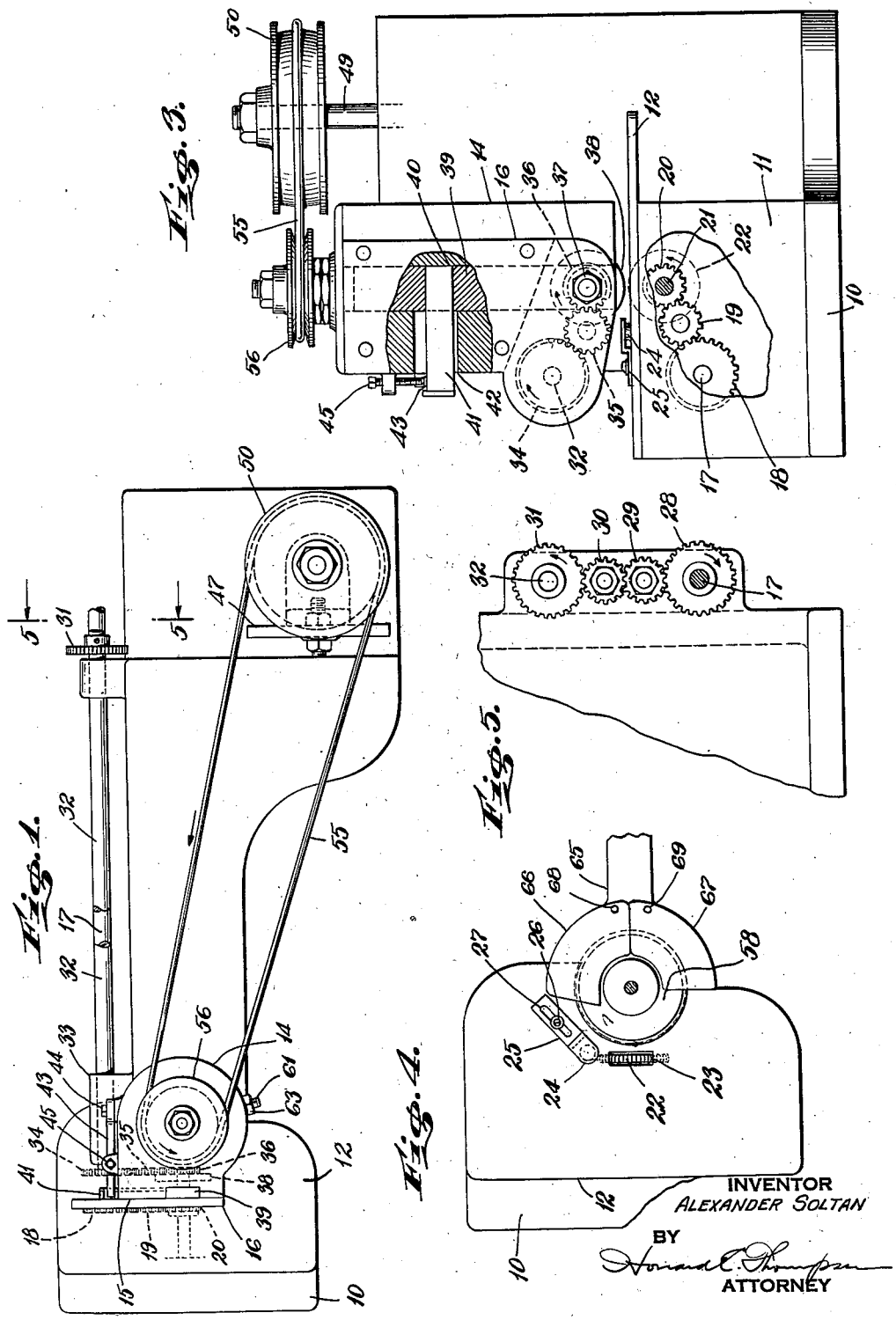
Fig. 1 is a plan view of the machine made according to my invention.
Figure 2:
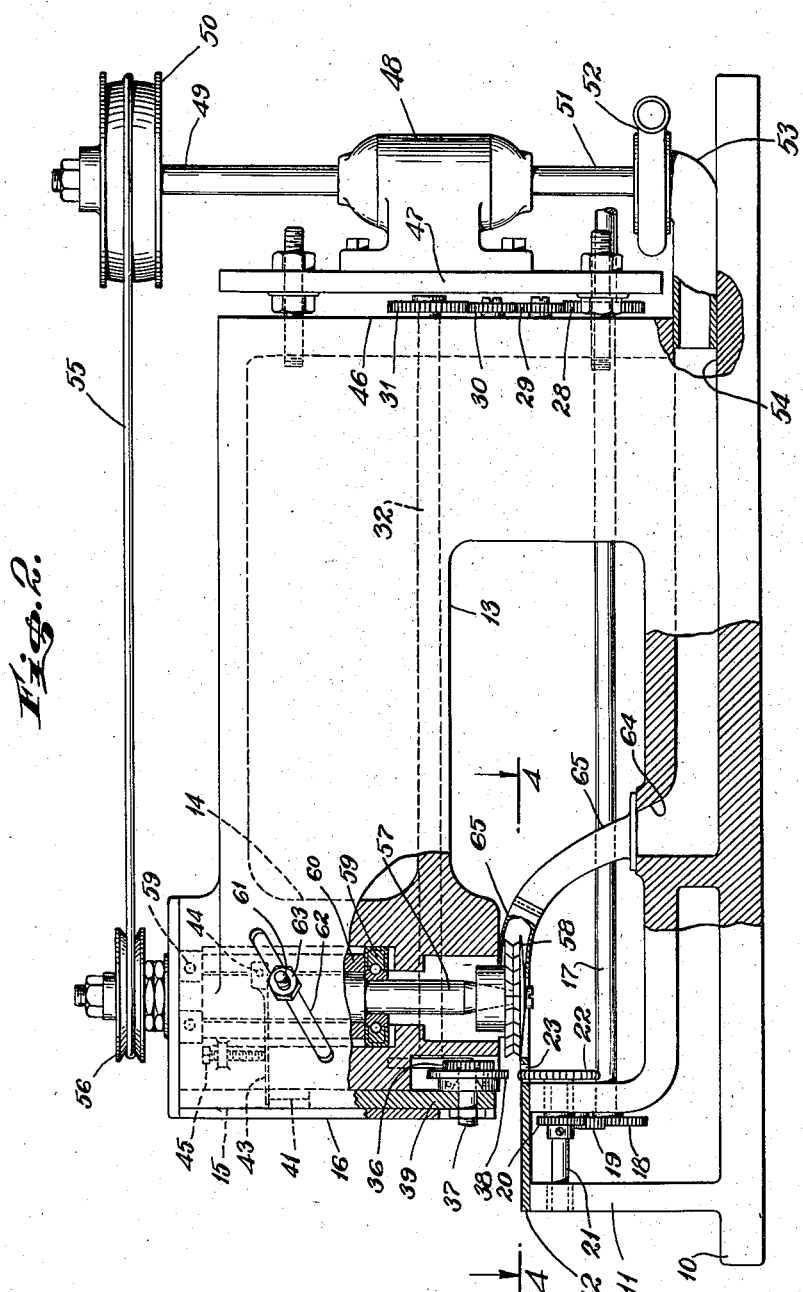
Fig. 2 is a side and sectional view of the machine with parts of the construction broken away.

In the construction shown, the frame of the machine comprises a base plate 10 having at its forward end an upstanding table supporting portion 11 upon which a table plate 12 is arranged. The rear end portion of the frame has an upwardly and forwardly directed substantially L-shaped vertical frame portion 13 at the forward end of which is a cylindrical part 14. The outer or front portion of the part 14 is flattened as seen at 15 and of the irregular contour seen in Fig. 3 of the drawings. Arranged upon this flattened portion is a cover plate 16.

Mounted in suitable bearings along one side of the frame of the machine is a main drive shaft 17 which extends forwardly to the support 11. On the forward end of the shaft 17 is a gear 18 meshing with an idler 19 which in turn meshes with a gear 20 on a shaft 21. On this shaft is a large workpiece feed wheel 22 having any suitable roughened peripheral surface to engage the workpiece in feeding the same over the upper surface of the table 12. The wheel 22 protrudes through an aperture 23 formed in the table 12, as clearly seen in Fig. 4 of the drawings. Mounted on the table 12 to the rear side of the feed wheel 22 is a workpiece guide roller 24 adjustably supported by a bracket 25 adjustable on the table 12 through a clamp screw or nut 26 operating in an elongated aperture 27 in said bracket.

At the rear end of the shaft 17 is a gear 28 which meshes with one idler 29, this in turn meshing with another idler 30. The latter meshes with a gear 31 at the rear end of a supplemental drive shaft 32 which extends longitudinally of the frame 13 and is arranged in a suitable bearing 33 at one side of the cylindrical portion 14 of the frame. At the forward end of the shaft 32 is a gear 34 meshing with an idler 35, which in turn meshes with a gear 36 on a stub shaft 37. Secured on the shaft 37 is a workpiece engaging pressure wheel 38 arranged directly above the feed wheel 22 and which serves to support the workpiece in firm engagement with the feed wheel. The shaft 37 is fixedly secured in a vertically movable slide bar 39 arranged in a channel 40 in the flat surface 15 of the cylinder 14. Keyed to the bar 39 is a laterally extending arm 41 which operates in an elongated aperture 42 in the cylinder 14 and protrudes outwardly through said cylinder. A spring arm 43 bears upon the arm 41 to tensionally support the roller 38 in firm engagement with the workpiece. The inner end of the spring is secured to a fixed support as seen at 44, and at 45 is an adjustment screw engaging the spring arm 43 to regulate the pressure thereof upon the arm 41 in controlling pressure engagement of the roller 38 with the workpiece.

Arranged upon the rear surface 46 of the upwardly extending portion 13 of the frame is an adjustable motor supporting plate 47 upon which an electric motor 48 is arranged with the shaft of the motor extending vertically. The motor shaft is coupled with a pulley shaft 49 upon which a drive pulley 50 is arranged and also with a blower shaft 51 for actuating a blower 52. The latter has a tubular extension 53 extending into and movable in an elongated duct 54 arranged in the base of the frame; the purposes of which will be later described.

Arranged upon the pulley 50 is a drive belt 55 which extends forwardly and passes around another pulley 56 arranged upon a tool operating shaft or spindle 57. The spindle extends downwardly through the tubular portion 14 of the frame and protrudes beyond the lower end thereof to receive and support a cutter or trimming wheel 58 which is detachable with respect to the end of the spindle. The cutter 58 is arranged rearwardly of the workpiece feed wheel 22 and is adjustable relatively thereto for proper alinement with the peripheral edge of a workpiece fed through the machine between the wheels 22 and 38 and guided by the roller 24.

The spindle 57 has suitable ball bearing mountings 59 in the cylindrical portion 14, and arranged between these bearings is an elongated sleeve or bushing 60 having at one side thereof an outwardly protruding threaded pin 61 which operates in an inclined aperture 62 formed in the cylindrical portion 14 for quickly adjusting the tool 58 vertically in the machine. The tool is held in different positions of adjustment by a clamp nut 63 which is arranged on the threaded pin or stud 61. This nut retains the sleeve or bushing 60 stationary so that the spindle 57 is free to rotate in the ball bearings arranged at the ends of the bushing. Of course the vertical adjustment of the cutter 58 is slight and therefore limited clearances are necessary. It will be understood that the bearings 59 move with the bushing 60 in its sliding movement in the part 14 of the frame. It will also be apparent that the pulley 56 moves with the spindle, the slight movement having no detrimental effect with regard to the drive through the pulley.

The forward end portion of the duct has an upwardly extending extension 64 which opens into a curved tubular extension 65, the latter terminating in two arc-shaped channeled segments 66 and 67, note Fig. 4. The segment 66 is pivoted to the extension 65 as seen at 68, whereas the segment 67 is pivoted to the extension 65 as seen at 69, so that these two segments may be swung clear of the cutter wheel 58 which is substantially enveloped thereby in the operation of detaching this wheel. The segment 66 extends around a greater portion of the wheel 58 than does the segment 67. In other words, the shorter or smaller segment 67 provides clearance for the free movement of a sole in passing through the machine. It will appear that any dust or particles that may be created or formed in the operation of the cutter upon the workpiece would be drawn by the suction created in the segments 66, 67, the extension 65 and the duct 54 and discharged from the suction blower 52 to a suitable discharge or receptacle. This will keep the workpiece and the table of the machine free and clear of any foreign particles and will further eliminate to a large degree the transmission of dust or other particles into the room in which the machine is being operated.

It will be apparent that the arrangement of the gears 35 and 36 with respect to each other provides for a limited free vertical movement of the pressure roller 38 in the head of the machine through the action of the adjustable tension spring 43. While the roller 38 is shown in raised position, it will be understood that downward movement of the roller will be checked by any suitable means, such for example as the engagement of the arm 41 with the bottom wall of the aperture 42, note Fig. 3, so as to keep the wheel 38 out of engagement with the workpiece feed wheel 22.

In the operation of the machine, it will be apparent that the workpiece is placed on the table 12, and one edge portion thereof is fed between the wheels 22 and 38 while the workpiece is moved in the direction of the cutter 58. The contour and structure of the cutter or other element 58 will control and govern the operation performed upon the peripheral edge of the workpiece as the workpiece is automatically fed through the machine by the feed roller 22 and guided by the roller 24; the latter being employed particularly when dealing with workpieces of irregular contour, such for example as the soles of shoes.

It is also preferred that the cutter or element 58 be rotated in a direction opposite to the feed of the workpiece through the machine; particularly when this element 58 is in the form of a trimming tool and the speed of rotation of the element 58 may be governed by the particular drive which is provided. However, in most instances, a relatively high speed drive is provided comparatively with a slower speed of feed of the workpiece through the machine. It will also be understood that other types and kinds of tools or elements 58 may be employed to perform various kinds of operations upon the workpiece. For example, burnishing tools, grinding, shaping, forming or dressing tools of various kinds and classes may be employed, and this is especially true when the machine is used for performing operations on workpieces of different kinds and classes.

It will appear that by arranging the tool or operating element 58 in what might be termed the head or superstructure of the machine in the manner described, and by simply arranging the feed wheel in the table portion of the machine, the table portion is left free for the handling of workpieces of various kinds and classes. Still further, the machine is adapted then for use upon a bench or work table without the need of employing any understructure for the mounting of motors or other operating parts of the machine. It will also be apparent that the particular hanging of the tool drive spindles provides not only a simple well-balanced construction, but also a structure which facilitates quick and simplified attachment and detachment of the tool without disturbing any other part of the machine.

Having fully described my invention, what I claim as new and desire to secure by Letters Patent is:

1. A machine of the class described comprising a workpiece supporting table, a workpiece feed wheel having a portion of the periphery thereof protruding above the upper surface of the table to engage and feed a workpiece over said surface, means for rotating said wheel, a pressure roller arranged in alinement with said wheel, yieldable means moving the roller in the direction of the wheel to support a workpiece in engagement with said wheel, a tool operating spindle having its axis arranged at right angles to the axis of rotation of said wheel and roller, and means for adjusting the position of said spindle to move a tool thereon toward and from the periphery of the feed wheel to locate the tool with respect to the edge of the workpiece fed through the machine by said wheel.

2. A machine of the class described comprising a workpiece supporting table, a workpiece feed wheel having a portion of the periphery thereof protruding above the upper surface of the table to engage and feed a workpiece over said surface, means for rotating said wheel, a pressure roller arranged in alinement with said wheel, yieldable means moving the roller in the direction of the wheel to support a workpiece in engagement with said wheel, a tool operating spindle having its axis arranged at right angles to the axis of rotation of said wheel and roller, and means for rotating said spindle and tool supported therein in a direction against the feed of the workpiece through the machine.

3. A machine for performing predetermined operation on peripheral edges of a workpiece comprising a rotatable disc-like tool, a perpendicular axis for said tool, a support for said axis disposed entirely above the tool leaving the tool free for quick attachment and detachment with respect to said axis, a pair of vertically disposed workpiece feeding rollers arranged adjacent the periphery of said tool with adjacent surfaces of said rollers adjacent the periphery of said tool, one roller being arranged on a fixed axis, means yieldably supporting the other roller to move toward and from the first named roller, said rollers having independent drives from a common power source, and independent means for rotating the axis of said tool.

4. A machine for trimming peripheral edge of a workpiece comprising a workpiece supporting table, a workpiece feed wheel supported in the table and protruding through the upper surface thereof, a rotatable disc-like tool arranged on a drive spindle disposed perpendicularly with respect to but at one side of said table with the major portion of the tool disposed above the upper surface of the table, a yieldably supported workpiece engaging roller arranged above the table in substantial alinement with said feed wheel to firmly support the workpiece in engagement with said wheel in the feed of the workpiece relatively to the periphery of the tool, means for rotating said feed wheel and roller, and independent means for rotating said tool.

5. In a machine of the class described, a workpiece supporting table, a pair of driven workpiece feed rollers, one arranged below the table with the periphery thereof exposed through the surface of the table for engagement with a workpiece, and the other arranged above said table in vertical alinement with the first mentioned roller, a rotatable disc-like tool arranged upon a vertical axis with the periphery of the tool disposed in close proximity to said rollers and in alinement with the upper surface of the table to engage the peripheral edge of a work piece fed over the table by said rollers, the mounting for said tool being arranged above the table, and means adjusting the tool mounting to aline the tool with the workpiece.

6. A machine of the class described comprising a base, a workpiece table portion at one end of the base, the other end of the base having an upwardly and forwardly directed frame portion terminating at its forward end in a cylindrical head, a tool operating spindle freely rotatable in said head, vertically alined workpiece feed rollers in said table and head and arranged at the periphery of a tool supported in said spindle to feed a workpiece over the table for engagement with said tool, independent means rotating said feed rollers from a common drive, and one of said rollers having a roughened surface for firm engagement with the workpiece fed thereby.

7. A machine of the class described comprising a base, a workpiece table portion at one end of the base, the other end of the base having an upwardly and forwardly directed frame portion terminating at its forward end in a cylindrical head, a tool operating spindle freely rotatable in said head, vertically alined workpiece feed rollers in said table and head and arranged at the periphery of a tool supported in said spindle to feed a workpiece over the table for engagement with said tool, independent means rotating said feed rollers from a common drive, one of said rollers having a roughened surface for firm engagement with the workpiece fed thereby, and means yieldably supporting the other roller to urge the same in the direction of the first named roller in supporting the workpiece in engagement therewith.

8. A machine of the class described comprising a base, a workpiece table portion at one end of the base, the other end of the base having an upwardly and forwardly directed frame portion terminating at its forward end in a cylindrical head, a tool operating spindle freely rotatable in said head, vertically alined workpiece feed rollers in said table and head and arranged at the periphery of a tool supported in said spindle to feed a workpiece over the table for engagement with said tool, independent means rotating said feed rollers from a common drive, one of said rollers having a roughened surface for firm engagement with the workpiece fed thereby, means yieldably supporting the other roller to urge the same in the direction of the first named roller in supporting the workpiece in engagement therewith, and means adjusting the tool with respect to said feed rollers in controlling engagement with the workpiece fed through the machine by said rollers.

ALEXANDER SOLTAN.